(12) United States Patent
Setiawan et al.

(10) Patent No.: US 12,189,408 B2
(45) Date of Patent: Jan. 7, 2025

(54) VOLTAGE REGULATOR HAVING MINIMAL FLUCTUATION IN MULTIPLE OPERATING MODES

(71) Applicant: Silicon Laboratories Inc., Austin, TX (US)

(72) Inventors: Ricky Setiawan, Singapore (SG); Hua Beng Chan, Singapore (SG); Rex Tak Ying Wong, Singapore (SG)

(73) Assignee: Silicon Laboratories Inc., Austin, TX (US)

( * ) Notice: Subject to any disclaimer, the term of this patent is extended or adjusted under 35 U.S.C. 154(b) by 260 days.

(21) Appl. No.: 17/847,404

(22) Filed: Jun. 23, 2022

(65) Prior Publication Data

US 2022/0326725 A1 Oct. 13, 2022

Related U.S. Application Data

(62) Division of application No. 16/793,142, filed on Feb. 18, 2020, now Pat. No. 11,402,860.

(51) Int. Cl.
*G05F 1/575* (2006.01)
*G06F 1/30* (2006.01)

(52) U.S. Cl.
CPC .............. *G05F 1/575* (2013.01); *G06F 1/305* (2013.01)

(58) Field of Classification Search
CPC ........ G05F 1/575; G05F 1/59; H02M 3/1584; H02M 1/0045; H02M 1/0032
See application file for complete search history.

(56) References Cited

U.S. PATENT DOCUMENTS

| | | | |
|---|---|---|---|
| 5,770,940 A | 6/1998 | Goder | |
| 8,508,200 B2 | 8/2013 | Yamamoto et al. | |
| 8,922,187 B2 | 12/2014 | Swanson | |
| 9,529,374 B2 | 12/2016 | Enjalbert et al. | |
| 10,498,215 B1 | 12/2019 | Tang et al. | |
| 11,029,716 B1 | 6/2021 | Chan et al. | |
| 2004/0000896 A1* | 1/2004 | Barber, Jr. | .............. G05F 1/575 323/280 |
| 2009/0315531 A1 | 12/2009 | Liao et al. | |
| 2011/0241636 A1* | 10/2011 | Wu | ..................... H02M 3/1584 323/272 |

(Continued)

OTHER PUBLICATIONS

United States Patent Office, U.S. Appl. No. 16/793, 154, filed Feb. 18, 2020 (37 pgs).

(Continued)

*Primary Examiner* — Alex Torres-Rivera
(74) *Attorney, Agent, or Firm* — Trop, Pruner & Hu, P.C.

(57) ABSTRACT

In an embodiment, an apparatus includes: an amplifier to compare a reference voltage to a feedback voltage and to output a comparison signal based on the comparison; a first loop circuit coupled to the amplifier to receive the comparison signal and output a first feedback voltage for the amplifier to use as the feedback voltage in a first mode of operation; and a second loop circuit coupled to the amplifier. The second loop circuit may be configured to receive the comparison signal and output a second feedback voltage for the amplifier to use as the feedback voltage in a second mode of operation. The second feedback voltage may be greater than the first feedback voltage, and the second loop circuit may output a regulated voltage based on the comparison signal.

18 Claims, 7 Drawing Sheets

(56) References Cited

U.S. PATENT DOCUMENTS

| | | | |
|---|---|---|---|
| 2015/0061757 A1 | 3/2015 | Guo et al. | |
| 2016/0147239 A1 | 5/2016 | Yan et al. | |
| 2016/0224042 A1 | 8/2016 | Pons | |
| 2017/0063229 A1 | 3/2017 | Powell | |
| 2017/0093399 A1 | 3/2017 | Atkinson et al. | |
| 2018/0284826 A1* | 10/2018 | Sautto | G05F 1/575 |
| 2019/0339729 A1 | 11/2019 | Bink et al. | |
| 2021/0255654 A1 | 8/2021 | Chan et al. | |
| 2022/0019253 A1 | 1/2022 | Zukowski et al. | |

OTHER PUBLICATIONS

United States Patent Office, Restriction Requirement mailed May 1, 2020 in U.S. Appl. No. 16/793,154 (5 pgs).
United States Patent Office, Response to Restriction Requirement filed Jun. 30, 2020 in U.S. Appl. No. 16/793,154 (7 pgs).
United States Patent Office, Non-Final Office Action mailed Jul. 16, 2020 in U.S. Appl. No. 16/793,154 (19 pgs).
United States Patent Office, Response to Non-Final Office Action filed Oct. 16, 2020 in U.S. Appl. No. 16/793,154 (8 pgs).
United States Patent Office, Final Office Action mailed Nov. 13, 2020 in U.S. Appl. No. 16/793,154 (9 pgs).
United States Patent Office, Response to Final Office Action filed Jan. 11, 2021 in U.S. Appl. No. 16/793,154 (7 pgs).
United States Patent Office, Notice of Allowance mailed Feb. 4, 2021 in U.S. Appl. No. 16/793,154 (9 pgs).
United States Patent Office, Amendment Under 37 C.F.R. §1.312 filed Apr. 28, 2021 in U.S. Appl. No. 16/793,154 (6 pgs).
United States Patent Office, Restriction Requirement mailed Apr. 4, 2022 in U.S. Appl. No. 17/230,266 (5 pgs).
Wikipedia, Low-Dropout Regulator, https://en.wikipedia.org/wiki/Low-dropout_regulator, last updated Dec. 19, 2019 (6 pgs).
United States Patent Office, Non-Final Office Acction mailed Jun. 10, 2022 in U.S. Appl. No. 17/230,266 (22 pgs).
United States Patent Office, Response to Office Action filed Sep. 12, 2022 in U.S. Appl. No. 17/230,266 (8 pgs).
United States Patent Office, Notice of Allowance mailed Oct. 3, 2022 in U.S. Appl. No. 17/230,266 (8 pgs).

\* cited by examiner

VOLTAGE REGULATOR HAVING MINIMAL FLUCTUATION IN MULTIPLE OPERATING MODES

CROSS-REFERENCE TO RELATED APPLICATIONS

The present application is a divisional of U.S. patent application Ser. No. 16/793,142, filed on Feb. 18, 2020, the content of which is hereby incorporated by reference.

BACKGROUND

Modern integrated circuits (ICs) house vast amounts of computing and other processing capabilities. Internal circuitry of such ICs may operate at different voltage levels. Such voltages are provided, at least initially from off-chip sources. In turn, integrated circuits include one or more internal voltage regulators to regulate a supply voltage to required levels. It is a challenge for such regulator circuitry to operate over potentially wide input voltage ranges and output voltage ranges, as flexibility to enable wide operating ranges limits efficiency of the regulators. Such limits can impact performance, power consumption, among other considerations.

SUMMARY OF THE INVENTION

In one aspect, an apparatus includes: an amplifier to compare a reference voltage to a feedback voltage and to output a comparison signal based on the comparison; a first loop circuit coupled to the amplifier, wherein the first loop circuit is to receive the comparison signal and output a first feedback voltage, the amplifier to receive the first feedback voltage as the feedback voltage in a first mode of operation; and a second loop circuit coupled to the amplifier. The second loop circuit may be configured to receive the comparison signal and output a second feedback voltage, and the amplifier may be configured to receive the second feedback voltage as the feedback voltage in a second mode of operation. The second feedback voltage may be greater than the first feedback voltage, and the second loop circuit is to output a regulated voltage based on the comparison signal.

In an example, the apparatus further includes a selection circuit to receive the first feedback voltage and the second feedback voltage and provide a selected one of the first feedback voltage and the second feedback voltage to the amplifier in response to a feedback control signal. The apparatus may further include a controller to send the feedback control signal to cause the selection circuit to output the second feedback voltage during the second mode of operation. The apparatus may be a voltage regulator to operate during a normal operating mode, and the selection circuit is to output the second feedback voltage in the normal operating mode and to output the first feedback voltage in a transient operating mode occurring between a snooze mode and the normal operating mode.

In an example, the apparatus may further include a second voltage regulator to operate during the snooze mode to output the regulated voltage, the second voltage regulator to operate with lower power consumption than the voltage regulator. The voltage regulator may be a closed loop regulator and the second voltage regulator may be an open loop regulator.

In an example, the first loop circuit comprises: a first metal oxide semiconductor field effect transistor (MOSFET) having a gate terminal to receive the comparison signal, a first terminal coupled to a first current source and a second terminal coupled to a first node; a second MOSFET having a gate terminal coupled to a second current source, a first terminal coupled to the first node, and a second terminal coupled to a supply voltage node; and a third MOSFET having a gate terminal to receive a first bias voltage, a first terminal coupled to the second current source, and a second terminal coupled to the first current source. The apparatus may further comprise a first resistor ladder coupled to the first node and having a first intermediate node to provide the first feedback voltage to the selection circuit. The apparatus may further comprise a second selection circuit coupled to a second resistor ladder, the second selection circuit to selectively provide one of a plurality of reference voltages obtained from the second resistor ladder to the amplifier as the reference voltage. The second selection circuit may selectively provide the one of the plurality of reference voltages based on a control signal. The second loop circuit may comprise: a fourth MOSFET having a gate terminal to receive the comparison signal, a first terminal coupled to a third current source and a second terminal coupled to an output node; a fifth MOSFET having a gate terminal coupled to a fourth current source, a first terminal coupled to the output node, and a second terminal coupled to the supply voltage node; and a sixth MOSFET having a gate terminal to receive a second bias voltage, a first terminal coupled to the fourth current source, and a second terminal coupled to the third current source.

In an example, the amplifier comprises a first transconductor, and the apparatus further comprises a second transconductor to receive a bias voltage and output a saturation prevention signal to an output node of the first transconductor to prevent the first transconductor from saturation. The first loop circuit is formed of one or more transistors of a first size and the second loop circuit is formed of one or more transistors of a second size, the second size greater than the first size.

In another aspect, an integrated circuit includes: a first voltage regulator to receive a supply voltage and provide a regulated voltage to a load circuit in a snooze mode; and a second voltage regulator to receive the supply voltage and provide the regulated voltage to the load circuit in an active mode, where the second voltage regulator is configured to receive the supply voltage at a level above the regulated voltage and at a level below the regulated voltage and to provide the regulated voltage to the load circuit when the supply voltage is above the regulated voltage and when the supply voltage is less than the regulated voltage.

In an example, the second voltage regulator comprises a closed loop circuit having a first loop and a second loop. The first loop may be configured to provide a first feedback voltage to an amplifier of the second voltage regulator during a transition from the snooze mode to the active mode, and the second loop may be configured to provide a second feedback voltage to the amplifier during the active mode. The second voltage regulator may comprise: a first transconductor to compare a reference voltage to a feedback voltage and to output at an output node a comparison signal based on the comparison; and a second transconductor to receive a bias voltage and output a saturation prevention signal to the output node of the first transconductor to prevent the first transconductor from saturation.

In yet another aspect, a method comprises: receiving a supply voltage in a first voltage regulator to output a first regulated voltage; when the supply voltage is lower than the first regulated voltage, activating a secondary transconductor of the first voltage regulator to prevent saturation of a main transconductor of the first voltage regulator; and when the supply voltage is greater than the first regulated voltage, regulating the supply voltage with the first voltage regulator to output the first regulated voltage to an output node of the first voltage regulator. Such regulating may include: for a first time duration, regulating the supply voltage using a first feedback signal from a first feedback loop of the first voltage regulator while maintaining a second voltage regulator active; and for a second time duration, regulating the supply voltage using a second feedback signal from a second feedback loop of the first voltage regulator while the second voltage regulator is disabled.

In an example, the first time duration comprises an overlap time duration when the first voltage regulator and the second voltage regulator are active. The method may further include in response to a snooze mode signal, disabling the first voltage regulator and enabling the second voltage regulator to output the first regulated voltage to the output node, where the first voltage regulator has a higher current consumption level than the second voltage regulator.

DETAILED DESCRIPTION

In various embodiments, an integrated circuit having at least one on-chip voltage regulator may be flexibly controlled to cause the voltage regulator to operate with wide input and output voltage ranges. In addition, the voltage regulator circuitry may include multiple independent voltage regulators, which can be controlled to be dynamically enabled and disabled in different modes of operation, to provide one or more regulated voltage levels with differing current capabilities.

Figure 1:
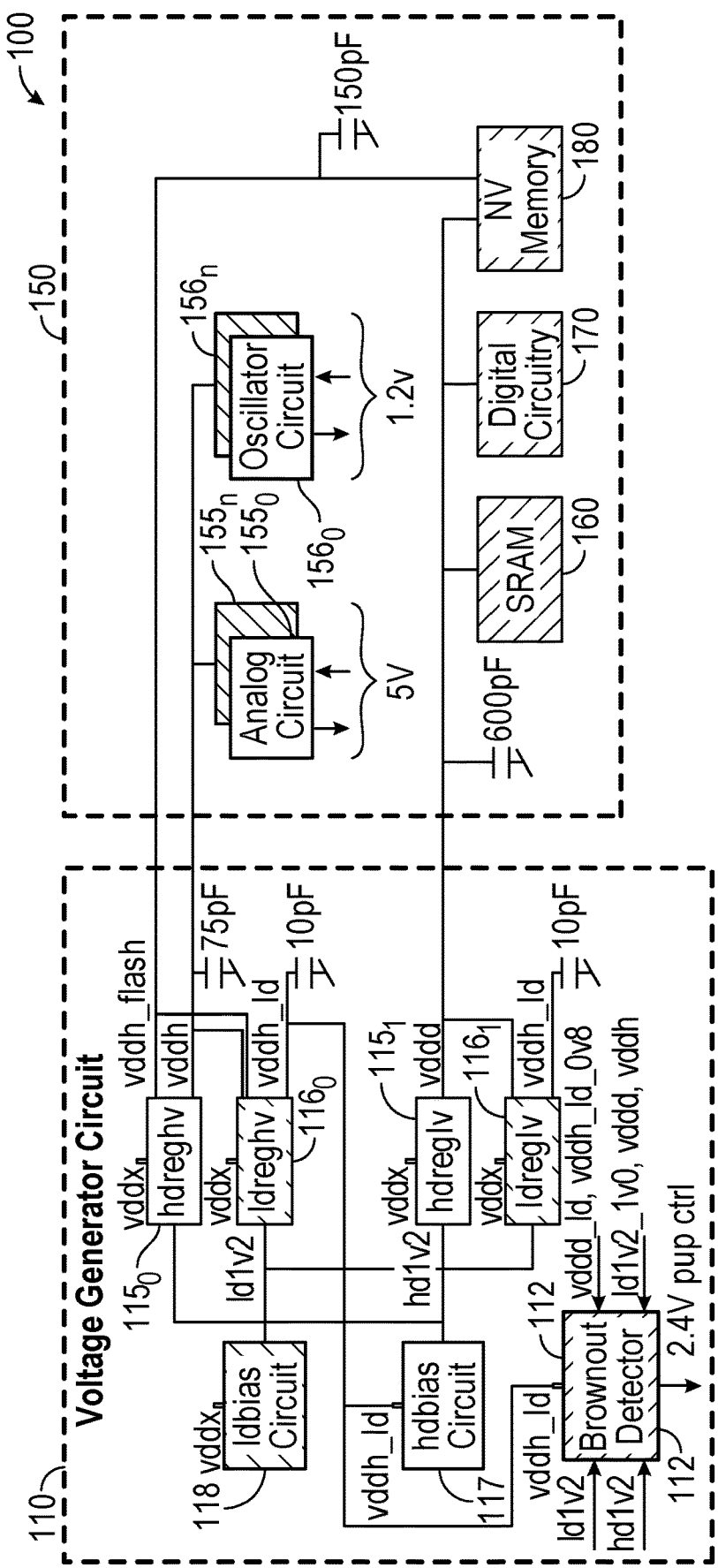
FIG. 1 is a high level block diagram of an integrated circuit in accordance with an embodiment.

Referring now to FIG. 1, shown is a high level block diagram of an integrated circuit (IC) in accordance with an embodiment. As shown in FIG. 1, IC 100 includes a voltage generator circuit 110 (details of which are described further herein) and circuitry 150, which may include the main analog and digital circuitry of IC 100. In the high level of FIG. 1, only a few relevant components within IC 100 are shown. Suffice to say, a given integrated circuit may include a wide variety of different components, ranging from processing circuitry such as processing cores, microcontroller units and so forth, to analog circuitry, memory circuitry, peripheral circuitry, radio frequency (RF) circuitry, and many other types of circuitry. In an embodiment, all circuitry shown in FIG. 1 may be implemented on a single semiconductor die.

In the high level shown, circuitry 150 includes a plurality of analog circuits 1550-n. As examples, such analog circuits may include analog-to-digital converters, digital-to-analog converters, buffer circuitry, comparison circuitry and so forth. Circuitry 150 is further shown to include oscillator circuitry 156o-n, which may be used to generate one or more clock signals for use within IC 100. In addition, circuitry 150 further may include various memory devices, including static random access memory (SRAM) 160 and a non-volatile memory 180, which in the embodiment of FIG. 1 is implemented as a flash memory. In addition, circuitry 150 further includes digital circuitry 170 which may include various digital processing circuitry.

With reference to voltage generator circuit 110, different components are provided to enable generation of multiple voltages, both in a high power mode of operation (generally referred to herein as an HD mode) and in a low power mode of operation (generally referred to herein as an LD mode). As seen, voltage generator circuit 110 includes a brownout detector 112. Brownout detector 112 is configured to receive a regulated voltage output by at least one of multiple internal voltage regulators 115, 116 and determine presence of a brownout condition. When such brownout condition is detected, brownout detector 112 may issue a brownout signal, which may cause a reset of IC 100. As further shown, brownout detector 112 further may be configured to output a power control signal when it detects that regulators 115, 116 are outputting an appropriate regulated voltage. Brownout detector 112 may also detect a supply voltage (vddx), LD bandgap reference voltage (LDBIAS) and HD bandgap reference voltage (HDBIAS).

As further shown, voltage generator circuit 110 includes a plurality of voltage regulators 115 and 116. In an embodiment, voltage regulators 115, 116 may be implemented as low dropout (LDO) regulators. More specifically, multiple high power voltage regulators $115_{0,1}$ are provided to generate a plurality of regulated voltages. Understand while voltage regulator $115_0$ is shown as a single block, in various embodiments it may include multiple internal voltage regulators each to generate a corresponding regulated voltage. Such voltage regulators 115 may operate in a high power mode of operation. Note that this high power mode of operation corresponds to normal operation of IC 100 when it is active. This high power mode of operation may be at a level to provide sufficient current to power all active circuitry of IC 100 at normal operating levels. In various embodiments, this high power mode of operation may be at a level to provide current of at least approximately 10 milliamperes (mA) of current capacity.

Instead when operating in a low power mode, e.g., a snooze mode, voltage regulators 115 may be disabled and corresponding low power voltage regulators $116_{0,1}$ may be active to generate corresponding regulated voltages in the low power mode. This snooze mode may be a low power mode in which minimal circuitry is active and only a minimal current level to provide leakage current and sufficient current for the minimally active circuits is present. In various embodiments, this low power mode of operation may be at a level to provide a maximum current of approximately 1 milliampere (mA) of current capacity.

As further shown in FIG. 1, voltage generator circuit 110 also includes a plurality of bias circuits, namely bias circuits 117, 118, which may generate corresponding bias voltages to be provided to voltage regulators 115, 116.

Those blocks of FIG. 1 shown in cross hatch are active both in low power mode and high power mode, such that these cross-hatched blocks are enabled in snooze mode. Instead blocks not having such cross-hatching are disabled in snooze mode. Thus high power voltage regulators 115 are disabled in snooze mode, along with corresponding bias circuit 117 and other circuitry including at least portions of analog circuits 155 and oscillator circuits 156. Note that regulators $116_{0,1}$ are in an always on domain unless in shutdown mode. A portion of regulator $116_0$ that is driving vddh is powered down during active mode, likewise a portion of regulator $116_1$ that is driving vddd is powered down during active mode. This circuitry of these regulators may be implemented as replica circuitry, and hence can be powered down independently without affecting the always on domain.

In an embodiment, voltage regulators $115_0$, $116_0$ may output a regulated voltage that is at a higher voltage level, e.g., 2.4V. More specifically voltage regulators $115_0$, $116_0$ may output multiple higher voltage levels (vddh and vddh_flash). In some cases these regulated voltages may be at the same high voltage level (e.g., 2.4 volts) or there may be separate regulated voltage levels provided, with a separate regulated voltage provided to non-volatile memory 180. As one particular embodiment, voltage regulator $115_0$ may output vddh at 2.4V (at 6 mA) and output vddh_flash at 3.3V (at 12 mA). Note that flash memory 180 may be powered by both a low voltage level output by regulators $115_1$, $116_1$ and a higher voltage level output by regulators $115_0$, $116_0$, as it is a dual power device. And note that the high voltage is to remain higher than the low voltage, otherwise there will be leakage flowing from the low voltage domain to the high voltage domain.

In an embodiment, voltage regulators $115_1$, $116_1$ may output a regulated voltage that is at a lower voltage level, e.g., 1.2V. Note that the voltage output lines from various regulators 115, 116 may include filter circuitry implemented by corresponding capacitors. While representative values are shown in FIG. 1, in other implementations such filters may have different capacitance level.

With further reference to FIG. 1, note that the regulated low voltage output level vddd is shared between regulators $115_1$ and $116_1$. In normal operating modes, voltage regulator $115_1$ drives this output voltage. In snooze mode this voltage regulator is powered down and voltage regulator $116_1$ maintains the regulated voltage level using an open loop source follower. Similarly, the regulated high voltage output levels vddh and vddh_flash are shared between regulators $115_0$ and $116_0$. In normal operating modes, voltage regulator $115_0$ drives this output voltage. In snooze mode this voltage regulator is powered down and voltage regulator $116_0$ maintains the regulated voltage levels using an open loop source follower. Understand while shown at this high level in the embodiment of FIG. 1, many variations and alternatives are possible.

Figure 2:
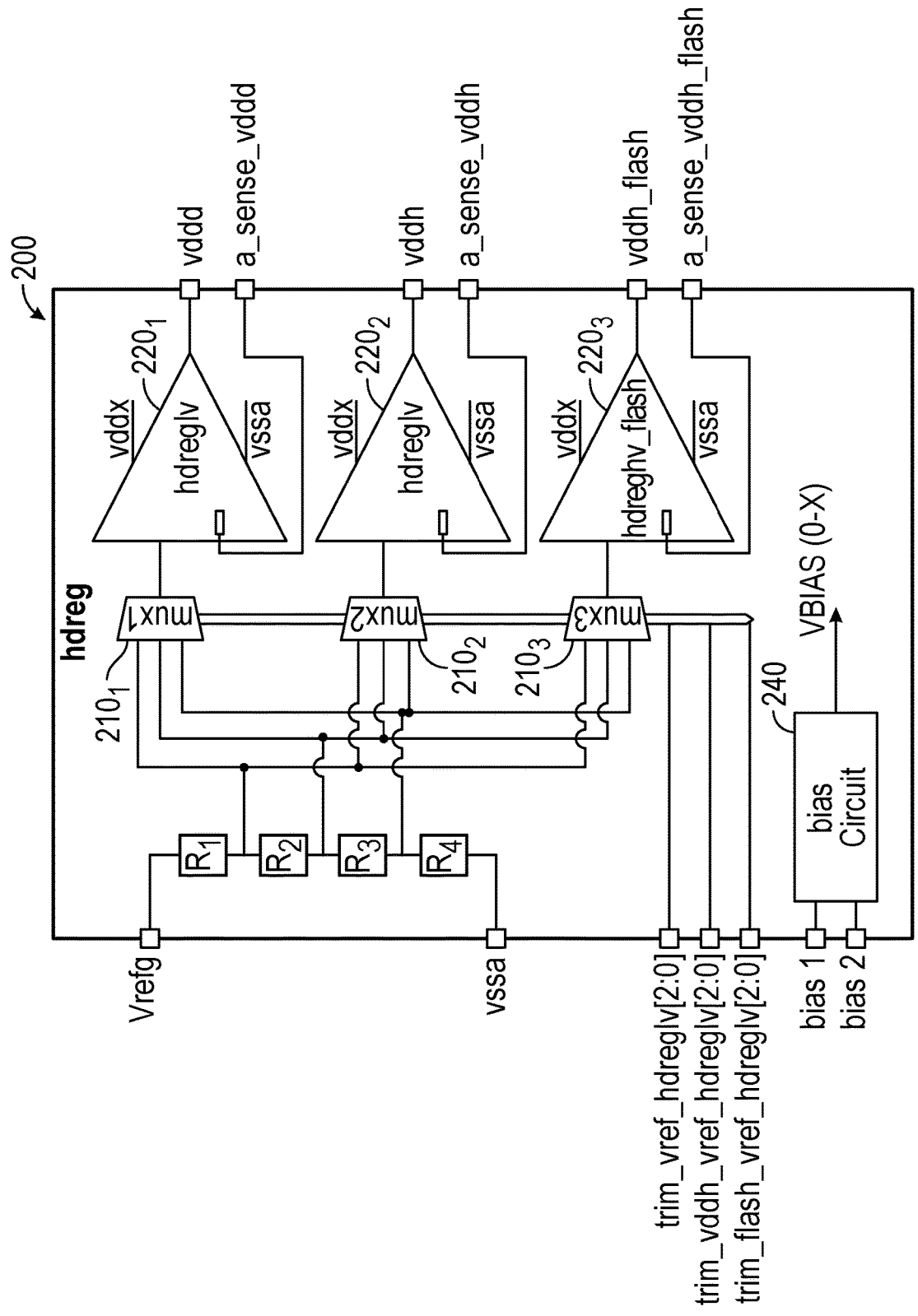
FIG. 2 is a block diagram of a high power voltage regulator in accordance with an embodiment.

Referring now to FIG. 2, shown is a block diagram of a high power voltage regulator in accordance with an embodiment. As shown in FIG. 2, voltage regulator 200 (which may correspond to high power regulators 115 of FIG. 1) includes a plurality of voltage regulators $220_{1-3}$. In an embodiment, regulators 220 may include transconductor (gm) cells. Details of representative voltage regulators are described further herein.

As illustrated in FIG. 2, each voltage regulator 220 is configured to receive a reference voltage from a corresponding selection circuit $210_{1-3}$. In an embodiment, selection circuits 210 may be implemented as multiplexers. As shown, each multiplexer 210 may receive a respective reference voltage generated via a resistor ladder including a plurality of series-coupled resistors R1-R4 that couple between a global reference voltage input (Vrefg) and a ground voltage (vssa) to receive a current. Depending upon a desired output voltage, each multiplexer 210 is controlled by incoming trim signals to provide a selected reference voltage to corresponding voltage regulator 220. The trim signals may be based on configuration settings for a given implementation. In some cases these trim signals may be received from firmware. In any event, understand that independent trim signals may be provided to each of selection circuits 210 to enable selection of an appropriate reference voltage for use by corresponding voltage regulator 220.

In turn, each voltage regulator 220 is configured to output a regulated voltage level based on a comparison between this reference voltage level and a sensed voltage corresponding to a sensed level of this regulated voltage. Each voltage regulator also receives a supply voltage (vddx) and a ground voltage (vssa). In different implementations, the supply voltage (vddx) may be provided with a wide input voltage range, e.g., from approximately 1.7 V to 5.5 V. With embodiments herein, always on high voltage protection circuitry is implemented within the voltage regulators to ensure reliability of devices. In embodiments, minimal current consumption may be realized, e.g., on the order of nano-amperes.

As further shown in FIG. 2, a bias circuit 240 is configured to receive bias currents and generate corresponding bias currents that are provided to each voltage regulator 220. Understand while shown at this high level in the embodiment of FIG. 2, many variations and alternatives are possible.

Figure 3:
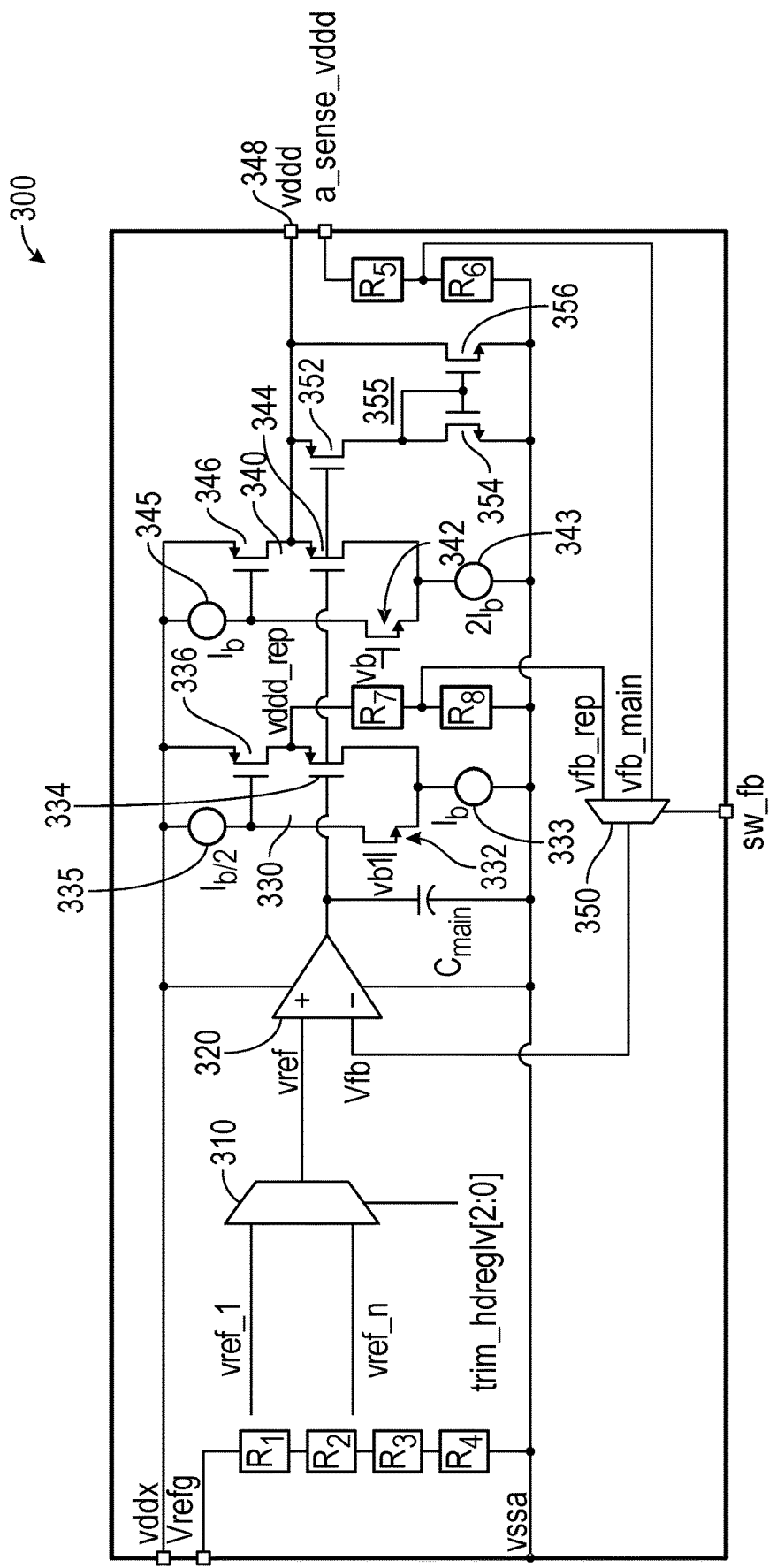
FIG. 3 is a schematic diagram of a voltage regulator in accordance with one embodiment.

Referring now to FIG. 3, shown is a schematic diagram of a voltage regulator in accordance with one embodiment. As shown in FIG. 3, voltage regulator 300 is a high power voltage regulator that is configured to output a regulated low voltage (vddd). This low voltage, in embodiments, may be between approximately 1.1 volts and 1.275 volts, which can be programmable, e.g., in 25 millivolt (mv) steps. In an embodiment, regulator 300 may output a 10 milliampere (mA) DC load current with a maximum loading capacitance of approximately 1 nano-Farad (nF). Regulator 300 may include series and shunt regulators with adjustable bandwidth control. As high bandwidth may be needed for a large and fast transient load step, regulator 300 consumes more current to achieve high bandwidth and maintain stability. In some other cases, when load step is small, a lower bandwidth can be employed to save power.

As shown in FIG. 3, voltage regulator 300 includes a transconductor 320 configured to receive a reference voltage (vref) and a feedback voltage (vfb). As will be described further herein, depending on mode of operation, this feedback voltage may be received from a replica loop 330 or a main loop 340, details of which are described further herein.

As shown in FIG. 3, the reference voltage (vref) is received from a selection circuit 310 (e.g., implemented as a multiplexer). As shown, multiplexer 310 is configured to receive a plurality of reference voltage levels from a resistor ladder formed of a plurality of resistors (R1-R4) coupled between a global reference voltage input (vrefg) that is a locally generated reference voltage that is shared among the multiple high power voltage regulators and a ground voltage level (vssa). Depending upon mode of operation, a selected one of multiple reference voltage levels (vref_1-vref_n) may be provided as the reference voltage level that is used to regulate the voltage output. In the embodiment of FIG. 3, this selection is based on a control signal (trim_hdreglv[2:0]), which may be received, e.g., from a control circuit. Also note presence of a main capacitor (Cmain) coupled to the output of transconductor 320 that acts as a compensation capacitor.

In an embodiment, transconductor 320 may be implemented as an error amplifier, e.g., formed of a differential transconductor pair. Based on comparison of the reference voltage to the feedback voltage, transconductor 320 outputs a comparison signal, which is provided to gate terminals of a pair of metal oxide semiconductor field effect transistor (MOSFET) devices 334, 344, each of which is of present in one of replica loop 330 and main loop 340. As shown, each of these devices is implemented as a p-channel MOSFET (PMOS) device.

First with reference to main loop 340, PMOS device 344 has a source terminal coupled to an output node 348 and a drain terminal coupled to a current source 343. Main loop 340 also includes another PMOS device 346 having a drain terminal coupled to output node 348 and a source terminal coupled to a supply voltage node (that receives the supply voltage vddx). PMOS device 346 thus acts as a pass device, which provides the regulated voltage to load circuitry via output node 348. In turn, PMOS device 346 has a gate terminal coupled to another current source 345. This gate terminal of PMOS device 346 also couples to a drain terminal of an n-channel MOSFET (NMOS) device 342 having a source terminal coupled to current source 343. In turn, NMOS device 342 has a gate terminal coupled to receive a first bias voltage (vb).

With reference now to replica loop 330, PMOS device 334 has a source terminal coupled to a feedback node 338 and a drain terminal coupled to a current source 333. Replica loop 330 also includes another PMOS device 336 having a drain terminal coupled to feedback node 338 and a source terminal coupled to the supply voltage node. In turn, PMOS device 336 has a gate terminal coupled to another current source 335. This gate terminal of PMOS device 336 also couples to a drain terminal of an NMOS device 332 having a source terminal coupled to current source 333. In turn, NMOS device 332 has a gate terminal coupled to receive a second bias voltage (vb1).

Note that the devices of main loop 340 and replica loop 330 may be differently sized. In embodiments, the devices of main loop 340 may be sized much larger than the devices of replica loop 340. As one example, main loop 340 may be formed of devices that are 85× the size of devices of replica loop 330. And as further shown current sources of main loop 340 and replica loop 330 may be sized differently. As shown in FIG. 3, current source 345 may have a first current level ($1_b$), while current source 343 may have double this current size (namely $2l_b$). In contrast, current sources 333, 335 of replica loop 330 may be smaller, e.g., having current values of $1_b$ (for current source 333) and $1_{b/2}$ (for current source 335).

Still with reference to FIG. 3, a selection circuit 350 selectively provides a feedback voltage to transconductor 320, either from replica loop 330 (vfb_rep) or from a sensed voltage (namely a voltage that is sensed from the regulated voltage vddd) (as vfb_main). As illustrated, these two feedback voltages are provided to selection circuit 350 via corresponding resistor pairs formed of resistors R5, R6 and R7, R8, respectively.

Based on mode of operation (namely a high power mode or a transient mode), a feedback control signal is provided based on a user selection (and received via a digital controller) to selection circuit 350 to selectively provide one of these corresponding feedback voltages to transconductor 320.

As further shown in FIG. 3, regulator 300 also includes a shunt regulator 350. As shown, shunt regulator 350 includes a current mirror formed of NMOS devices 354, 356 that couple between a ground voltage node and output node 348. NMOS device 356 may be sized much larger than NMOS device 354 (e.g., approximately 30:1) in an embodiment. Shunt regulator 350 further includes a PMOS output device 352 having a gate terminal to receive the comparison signal, a drain terminal coupled to NMOS device 354 and a source terminal coupled to output node 348. Shunt regulator 350 essentially acts as a current mirror with high pass function and limited gain. As such, it provides a low impedance path to ground to reduce large overshoot, like a diode Although shown at this high level in the embodiment of FIG. 3, many variations and alternatives are possible.

Figure 4:
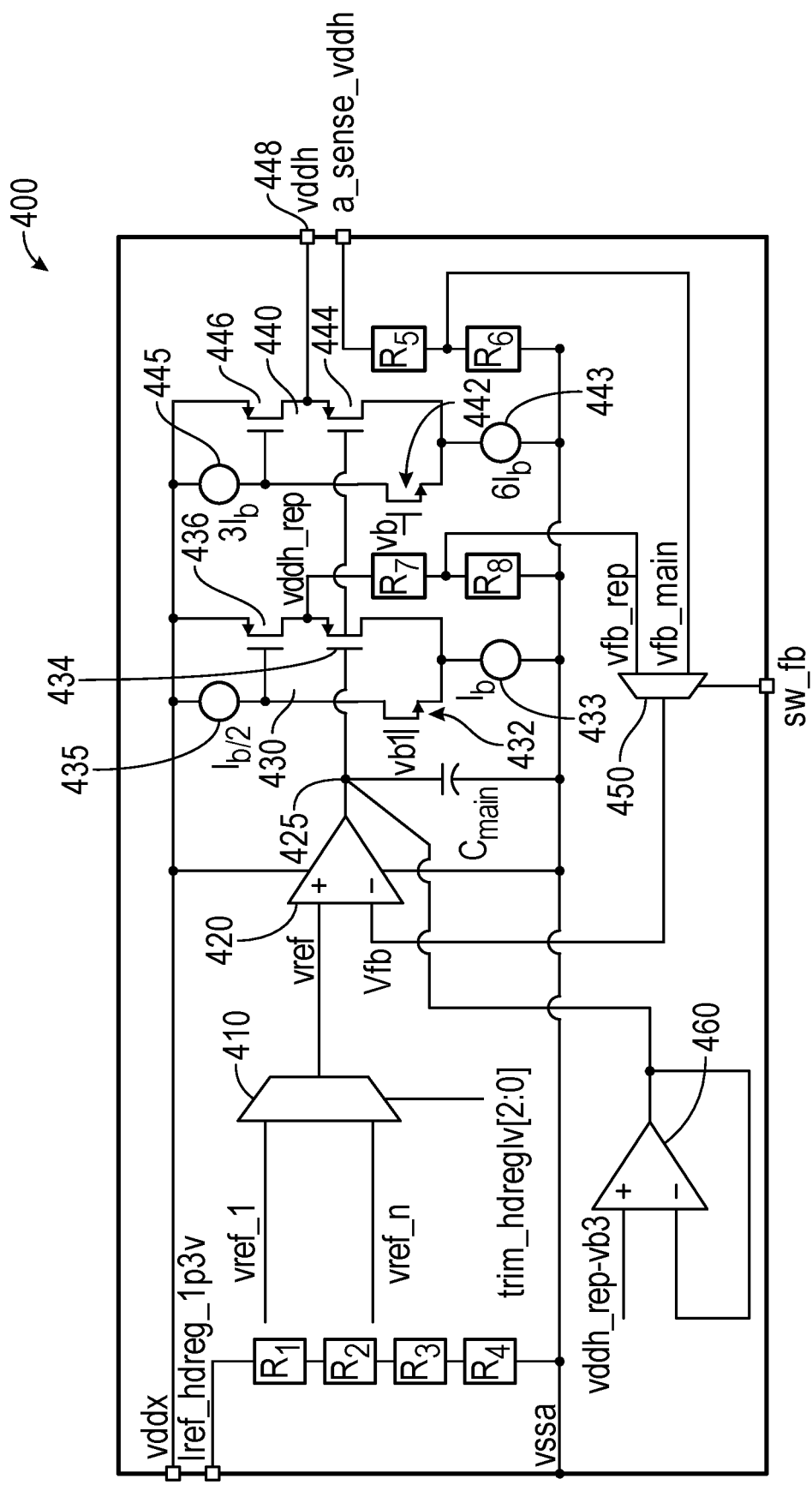
FIG. 4 is a schematic diagram of another voltage regulator in accordance with one embodiment.

Referring now to FIG. 4, shown is a schematic diagram of another voltage regulator in accordance with one embodiment. As shown in FIG. 4, voltage regulator 400 is a high power voltage regulator that is configured to output a regulated high voltage (vddh). This high voltage, in embodiments, may be between approximately 2.2 volts and 2.5 volts, which can be programmable, e.g., in 50 mv steps, and may output 6 mA of DC load current with a loading capacitance maximum of approximately 200 pF. Regulator 400 may be configured to operate to drop out condition such as where the supply voltage level (vddx) is between 1.7V and 2.4V. Voltage regulator 400 may provide protection against line step even from dropout conditions.

In general, regulator 400 is implemented similarly to regulator 300 of FIG. 3 (note the use of "400" series reference numerals that correspond to "300" series reference numerals of FIG. 3). For ease of discussion, only differences between the regulators are discussed. To provide the higher regulated voltage levels, devices of larger sizes may be used. In an embodiment, main loop 440 may be formed of devices that are 280× the size of devices of replica loop 430. And as further shown, current sources of main loop 440 and replica loop 430 may be sized differently. As shown in FIG. 4, current source 445 may have a first current level ($3l_b$), while current source 443 may have double this current size (namely $6l_b$). In contrast, current sources 432, 435 of replica loop 430 may be smaller, e.g., having current values of $1_b$ (for current source 433) and $1_{b/2}$ (for current source 435).

With the arrangement shown for main loop 440 with equal valued resistors R5 and R6, regulator 300 may be controlled to regulate to 2*vref. And with a vref of 1.2V, this leads to a regulated output of 2*1.2V=2.4V. When supply voltage vddx is lower than 2.4V, regulator 400 regulates to a maximum possible output of vddx.

As further illustrated in FIG. 4, voltage regulator 400 includes an additional, replica transconductor 460. In embodiments, replica transconductor 460 receives a bias voltage at a reference input node (vddh_rep−vb3). In turn, transconductor 460 receives its output at a feedback input node. As shown, the output of replica transconductor 460 is provided as a saturation prevention signal to an output node 425 coupled to an output of transconductor 420. With this arrangement, this main transconductor is prevented from a saturation region, by limiting the output of this transconductor. This is so since the output of transconductor 420 is the dominant pole and is slower to react to changes. In an embodiment, replica transconductor 460 may be implemented as a common gate amplifier to prevent overshoot of the regulated voltage, thus protecting load circuitry from damaging voltage levels. While regulator 400 (which outputs 2.4V) of FIG. 4 is shown, understand that a similar regulator may be used to provide the regulated voltage vddh_flash.

Figure 5:
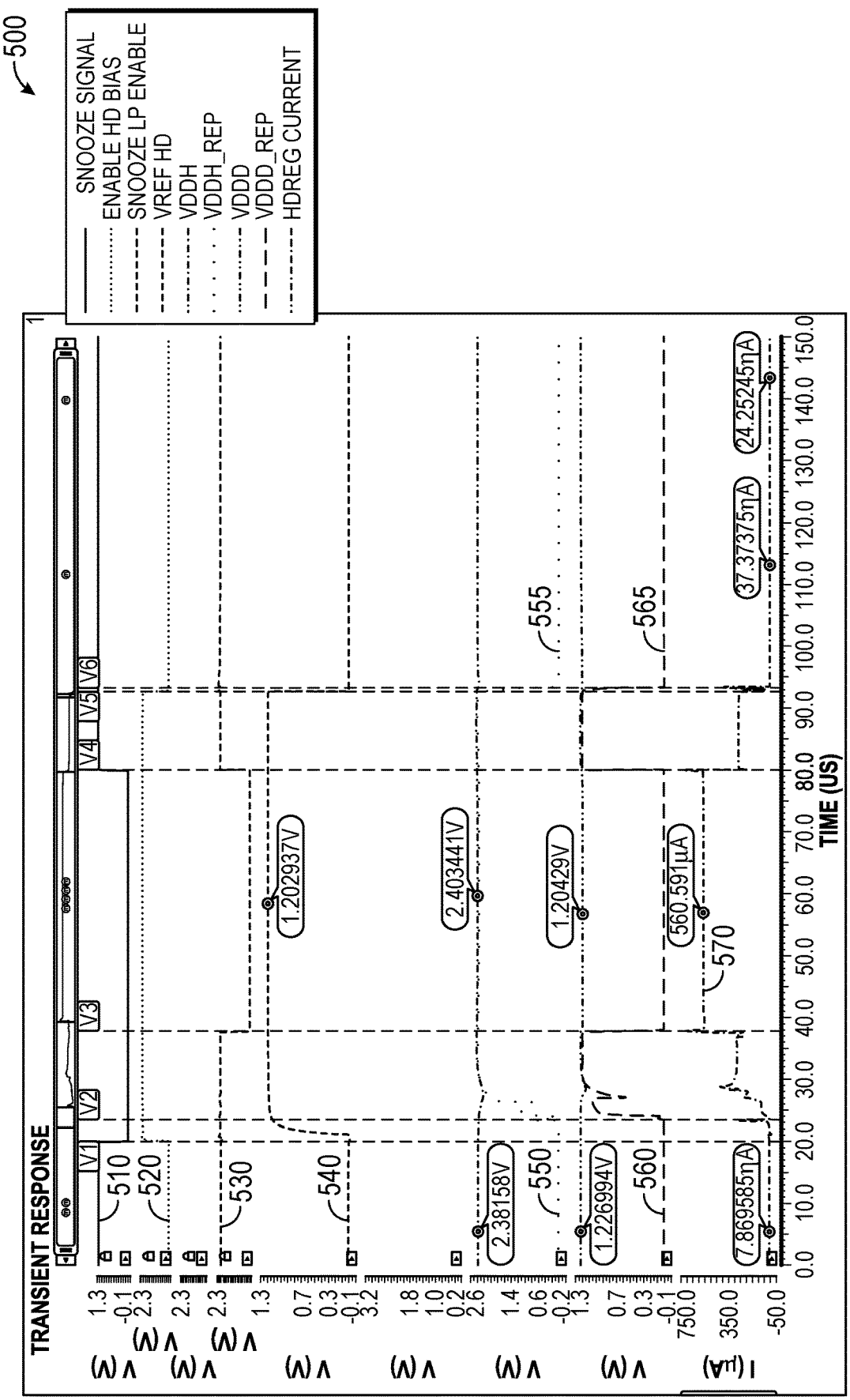
FIG. 5 is a timing diagram illustrating operation of a voltage regulator in accordance with an embodiment.

Referring now to FIG. 5, shown is a timing diagram illustrating operation of a voltage regulator in accordance with an embodiment. As shown in FIG. 5, timing diagram 500 illustrates operation of a voltage regulator during transient mode activity, namely when an IC exits a snooze mode and enters an active mode (e.g., for a brief wakeup) and then returns to snooze mode. At a high level, this operation may be realized by powering the integrated circuit using one or more low power voltage regulators while in the snooze mode. Then during a transient mode as the device transitions from snooze mode to active mode, such low power voltage regulators may continue to power circuitry while one or more high power voltage regulators are enabled to an active state, which may power the circuitry during the active mode. Thereafter, this high power voltage regulator is disabled and snooze mode current can be provided by the one or more low power voltage regulators.

As illustrated in FIG. 5, a snooze signal 510 may be used to cause transitions between the different modes. In an embodiment, control circuitry of the IC, e.g., implemented as a microcontroller unit (MCU), may provide this snooze signal. As seen, snooze signal 510 is initially at a logic high state to indicate snooze mode is active. Then it proceeds to a low state to indicate the active mode. And after completion of the active mode, the signal again is at a logic high state. In response to this signal, a bias enable signal 520 (enable HD bias) goes active, which causes bias circuitry to generate bias current and reference current for the high power voltage regulators. When a high power reference voltage becomes active as shown as signal 540, the high power voltage regulators are thus active and provide the regulated voltage level at a higher current level. As a result, the low power voltage regulators may be disabled, as shown at signal 530 (snooze LP enable). This signal also is sent to the digital block to indicate that active mode can begin.

Thus as illustrated, high power regulated voltages are made available, as shown at signals 550 and 560. Note that replica voltage levels output by the corresponding replica loops of the different high power voltage regulators are also shown at signal lines 555 and 565. Such replica outputs may be used as the feedback signals to the regulators during transient mode as the regulators become powered up. These replica outputs are only used as a feedback point during the transition period and do not drive anything. Finally, at signal line 570, the high power current level output by the high power regulators is shown, which is at sufficient current levels (e.g., at least approximately 500 uA) to power all active circuitry of the integrated circuit. Understand while shown at this high level in FIG. 5, many variations and alternatives are possible.

Figure 6:
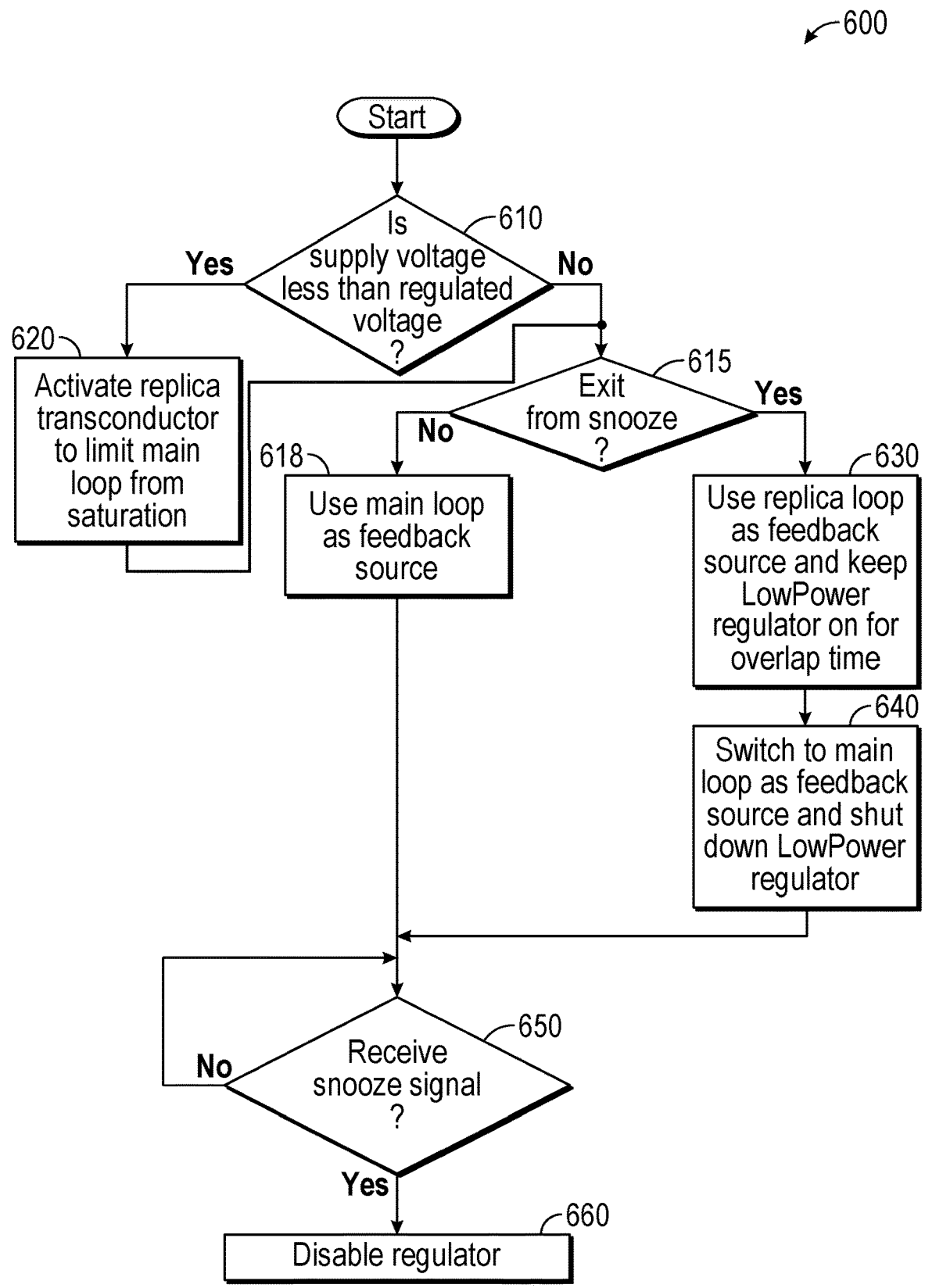
FIG. 6 is a flow diagram of a method in accordance with an embodiment.

Referring now to FIG. 6, shown is a flow diagram of a method in accordance with an embodiment. More specifically, method 600 is a method for controlling one or more high power voltage regulators in accordance with an embodiment. As one example, this voltage regulator may be a high power voltage regulator to provide a higher regulated voltage (e.g., voltage regulator 400 of FIG. 4). As illustrated, method 600 may be performed by hardware circuitry, firmware, software and/or combinations thereof. In a particular embodiment, method 600 may be performed within circuitry of the voltage regulator in response to control signals received based upon mode of operation as determined by a control circuit, such as an MCU.

As seen, method 600 may begin by determining whether a supply voltage is less than a regulated voltage (diamond 610). Such determination may be based on the received supply voltage. When it is determined that this supply voltage is less than the regulated voltage to be output, control passes to block 620 where a replica transconductor of the voltage regulator is activated to limit a main transconductor of the voltage regulator from saturation (e.g., deep saturation). So long as the supply voltage is less than the regulated voltage, this replica transconductor may be active until it is determined that an exit from snooze mode (in which a low power regulator is providing the regulated voltage) is occurring. Note that if the supply voltage is greater than the regulated voltage (as determined at diamond 610), the replica transconductor is not activated and the main loop is not limited form going into deep saturation.

Still with reference to FIG. 6, instead if the supply voltage is greater than the regulated voltage, control passes to diamond 615 to determine whether the exit from snooze mode is occurring. If so, control passes to block 630 where the voltage regulator may use a feedback signal from a replica loop of the regulator as a feedback source. In addition the low power regulator may remain powered on to aid in providing sufficient current during this start up of the high power voltage regulator.

Note that this replica loop output may be used as the feedback source for an overlap time duration (also referred to herein as a transient mode) while the voltage regulator becomes fully powered up. At this point, control passes to block 640 where the main loop may be used as the feedback source. Also at this point, the low power voltage regulator may be powered down. This main loop configuration of the voltage regulator may continue until is it determined that a snooze signal has been received (as determined at diamond 650). When such signal is received, the regulator may be disabled (block 660). In addition, the outputs are set to a high impedance state to enable the low power regulator to take over the high power regulator. With reference back to FIG. 4, the outputs vddh and a_sense_vddh may be set to the high impedance state. As such, all resistors become high impedance to support the snooze mode. Note that similar high impedance state control may be used for voltage regulator 300 of FIG. 3 such that the outputs vddd and a_sense_vddd also may be set to the high impedance state. And similarly, vddh_flash and a_sense_vddh_flash are also set to the high impedance state.

Instead if it is determined at diamond 615 that there has not been an exit from the snooze mode, control passes to block 618, where the main loop may be used as the feedback source. Understand while shown at this high level in the embodiment of FIG. 6, many variations and alternatives are possible.

Figure 7:
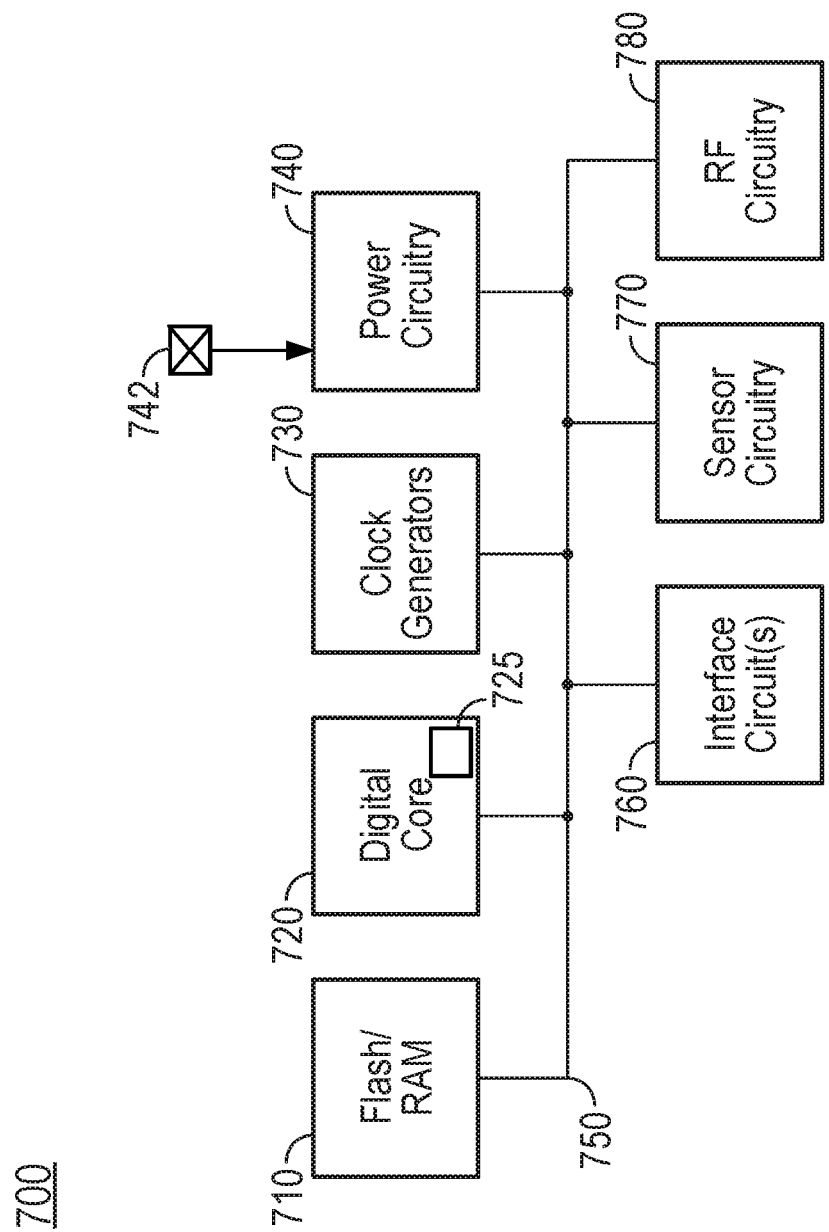
FIG. 7 is a block diagram of a representative integrated circuit in accordance with an embodiment.

Referring now to FIG. 7, shown is a block diagram of a representative integrated circuit 700 which may include a control circuit to control a voltage regulator of IC 700 to switch between high power and low power voltage regulators during mode changes between active and snooze modes of operation, as described herein. In the embodiment shown in FIG. 7, integrated circuit 700 may be, e.g., a microcontroller, wireless transceiver or other device that can be used for a variety of use cases, including sensing, monitoring, embedded applications, communications, applications and so forth. In the embodiment shown, integrated circuit 700 includes a memory system 710 which in an embodiment may include a non-volatile memory such as a flash memory and volatile storage, such as RAM. Memory system 710 couples via a bus 750 to a digital core 720, which may include one or more cores and/or microcontrollers that act as a main processing unit of the integrated circuit. Digital core 720 includes a regulator control circuit 725 which may provide control signals to control operation of voltage regulator circuitry present in a power circuitry 740. Digital core 720 also may couple to clock generators 730 which may provide one or more phase lock loops or other clock generation circuitry to generate various clocks for use by circuitry of the IC.

Power circuitry 740 may include one or more voltage regulators as described herein. As illustrated, at least one power pad 742 may provide a voltage to power circuitry 740, to be a supply voltage to one or more regulators of power circuitry 740. As discussed herein, this supply voltage may be at a level below, at or above a level of one or more regulated voltages output by the voltage regulators. One or more of such voltage regulators may include multiple feedback loops as described herein, to provide appropriate feedback voltages during transient operation when transitioning from a snooze mode to an active mode and vice versa.

As further illustrated in FIG. 7, additional circuitry optionally may be present depending on particular implementation to provide various functionality and interaction with external devices. Such circuitry may include interface circuitry 760 which may provide interface with various off-chip devices, sensor circuitry 770 which may include various on-chip sensors including digital and analog sensors to sense desired signals or so forth. In addition as shown in FIG. 7, RF circuitry 780 may be provided which may include analog circuitry of a transceiver to enable transmission and receipt of wireless signals, e.g., according to one or more of a local area or wide area wireless communication scheme, such as Zigbee, Bluetooth, IEEE 802.11, cellular communication or so forth. Understand while shown with this high level view, many variations and alternatives are possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An integrated circuit comprising:
a first voltage regulator to receive a supply voltage and provide a regulated voltage to a load circuit in a snooze mode; and
a second voltage regulator to receive the supply voltage and provide the regulated voltage to the load circuit in an active mode, wherein the second voltage regulator is configured to receive the supply voltage at at least one of a level above the regulated voltage or at a level below the regulated voltage and to provide the regulated voltage to the load circuit when the supply voltage is above the regulated voltage or when the supply voltage is less than the regulated voltage, wherein the second voltage regulator comprises:
a first transconductor to compare a reference voltage to a feedback voltage and to output at an output node a comparison signal based on the comparison; and
a second transconductor to receive a bias voltage and output a saturation prevention signal to the output node to prevent the first transconductor from saturation.

2. The integrated circuit of claim 1, wherein the second voltage regulator comprises a closed loop circuit having a first loop and a second loop.

3. The integrated circuit of claim 2, wherein the first loop is to provide a first feedback voltage to an amplifier of the second voltage regulator during a transition from the snooze mode to the active mode, and the second loop is to provide a second feedback voltage to the amplifier during the active mode.

4. The integrated circuit of claim 3, further comprising a selection circuit to receive the first feedback voltage and the second feedback voltage and provide a selected one of the first feedback voltage and the second feedback voltage to the amplifier in response to a feedback control signal.

5. The integrated circuit of claim 4, further comprising a controller to send the feedback control signal to cause the selection circuit to output the second feedback voltage during the active mode.

6. The integrated circuit of claim 3, wherein the first loop comprises:
a first metal oxide semiconductor field effect transistor (MOSFET) having a gate terminal to receive the comparison signal, a first terminal coupled to a first current source and a second terminal coupled to a first node;
a second MOSFET having a gate terminal coupled to a second current source, a first terminal coupled to the first node, and a second terminal coupled to a supply voltage node; and
a third MOSFET having a gate terminal to receive a first bias voltage, a first terminal coupled to the second current source, and a second terminal coupled to the first current source.

7. The integrated circuit of claim 6, further comprising a first resistor ladder coupled to the first node and having a first intermediate node to provide the first feedback voltage to the selection circuit.

8. The integrated circuit of claim 7, further comprising a second selection circuit coupled to a second resistor ladder, the second selection circuit to selectively provide one of a plurality of reference voltages obtained from the second resistor ladder to the amplifier as the reference voltage.

9. The integrated circuit of claim 8, wherein the second selection circuit is to selectively provide the one of the plurality of reference voltages based on a control signal.

10. The integrated circuit of claim 6, wherein the second loop comprises:
a fourth MOSFET having a gate terminal to receive the comparison signal, a first terminal coupled to a third current source and a second terminal coupled to the output node;
a fifth MOSFET having a gate terminal coupled to a fourth current source, a first terminal coupled to the output node, and a second terminal coupled to the supply voltage node; and
a sixth MOSFET having a gate terminal to receive a second bias voltage, a first terminal coupled to the fourth current source, and a second terminal coupled to the third current source.

11. The integrated circuit of claim 2, wherein the first loop is formed of one or more transistors of a first size and the second loop is formed of one or more transistors of a second size, the second size greater than the first size.

12. The integrated circuit of claim 1, wherein the first voltage regulator is to operate with lower power consumption than the second voltage regulator.

13. An apparatus comprising:
a voltage generator circuit comprising:
a first voltage regulator to receive a supply voltage and provide a regulated voltage to a load circuit in a snooze mode; and
a second voltage regulator to receive the supply voltage and provide the regulated voltage to the load circuit in an active mode, wherein the second voltage regulator is configured to receive the supply voltage at a level above the regulated voltage and at a level below the regulated voltage and to provide the regulated voltage to the load circuit when the supply voltage is above the regulated voltage and when the supply voltage is less than the regulated voltage, wherein:

when the supply voltage is lower than the regulated voltage, a second transconductor of the second voltage regulator is activated to prevent saturation of a first transconductor of the second voltage regulator; and when the supply voltage is greater than the regulated voltage, the supply voltage is regulated with the second voltage regulator to output the regulated voltage; and the load circuit coupled to the voltage generator circuit, the load circuit comprising:
a plurality of analog circuits; and
a digital circuit coupled to the plurality of analog circuits.

14. The apparatus of claim 13, wherein the second voltage regulator comprises a closed loop circuit having a first loop and a second loop, wherein the first loop is to provide a first feedback voltage to an amplifier of the second voltage regulator during a transition from the snooze mode to the active mode, and the second loop is to provide a second feedback voltage to the amplifier during the active mode.

15. The apparatus of claim 14, further comprising a selection circuit to receive the first feedback voltage and the second feedback voltage and provide a selected one of the first feedback voltage and the second feedback voltage to the amplifier in response to a feedback control signal.

16. A voltage generator circuit comprising:
a first voltage regulator to receive a supply voltage and provide a regulated voltage to a load circuit in a snooze mode; and
a second voltage regulator comprising a first transconductor and a second transconductor, wherein the second voltage regulator is to receive the supply voltage and provide the regulated voltage to the load circuit in an active mode, wherein the second voltage regulator is configured to receive the supply voltage at a level above the regulated voltage and at a level below the regulated voltage, wherein:
when the supply voltage is lower than the regulated voltage, the second transconductor is activated to prevent saturation of the first transconductor.

17. The voltage generator circuit of claim 16, wherein in response to a snooze mode signal, the second voltage regulator is disabled and the first voltage regulator is enabled to output the regulated voltage to the load circuit.

18. The voltage generator circuit of claim 16, wherein:
for a first time duration, the second voltage regulator is to regulate the supply voltage using a first feedback signal from a first feedback loop; and
for a second time duration, the second voltage regulator is to regulate the supply voltage using a second feedback signal from a second feedback loop.

* * * * *